United States Patent [19]

Berstein et al.

[11] Patent Number: 4,608,486
[45] Date of Patent: Aug. 26, 1986

[54] DATA ENTRY SYSTEM

[76] Inventors: Patrick Berstein, 209 Willowbrook Rd., Thornhill, Ontario, Canada, L3T 5L7; Jonathan Crinion, 325 Davenport Rd., Ste. 2, Toronto, Ontario, Canada, M5R 1K5; Robert J. Middlemiss, 3257 Chokecherry Crescent, Mississauga, Ontario, Canada, L5M 1B1; Peter Oomen, 81 Irwin Crescent, Georgetown, Ontario, Canada, L7G 1E7

[21] Appl. No.: 715,620

[22] Filed: Mar. 25, 1985

Related U.S. Application Data

[63] Continuation-in-part of Ser. No. 455,044, Jan. 3, 1983, Pat. No. 4,532,416.

[51] Int. Cl.⁴ .............................................. G06K 5/00
[52] U.S. Cl. ...................................... 235/380; 235/379
[58] Field of Search ................................. 235/379, 380

[56] References Cited

U.S. PATENT DOCUMENTS 4,532,416  7/1985  Berstein .............................. 235/380

Primary Examiner—Harold I. Pitts
Attorney, Agent, or Firm—Ridout & Maybee

[57] ABSTRACT

In a transaction terminal, a credit card reader is used not only to enter data from cards of customers, but a special card is used to place the terminal in supervisory modes in at least one of which it will accept data from further special cards which are used to input data used in the transaction mode, particularly alphanumeric data for printing on transaction slips. The terminal has a customer accessible auxiliary keyboard which may be used for data entry, at a location remote from the main unit, allowing for point of sale data entry, including private entry of a customer's Personal Identification Number, either to validate a transaction or during selection of a PIN for encryption by the terminal. Data captured by the auxiliary keyboard is only retained for so long as a customer's card resides in a slot in the auxiliary keyboard, and PIN numbers are encoded as part of a sequence in which data is downloaded to the main unit.

15 Claims, 8 Drawing Figures

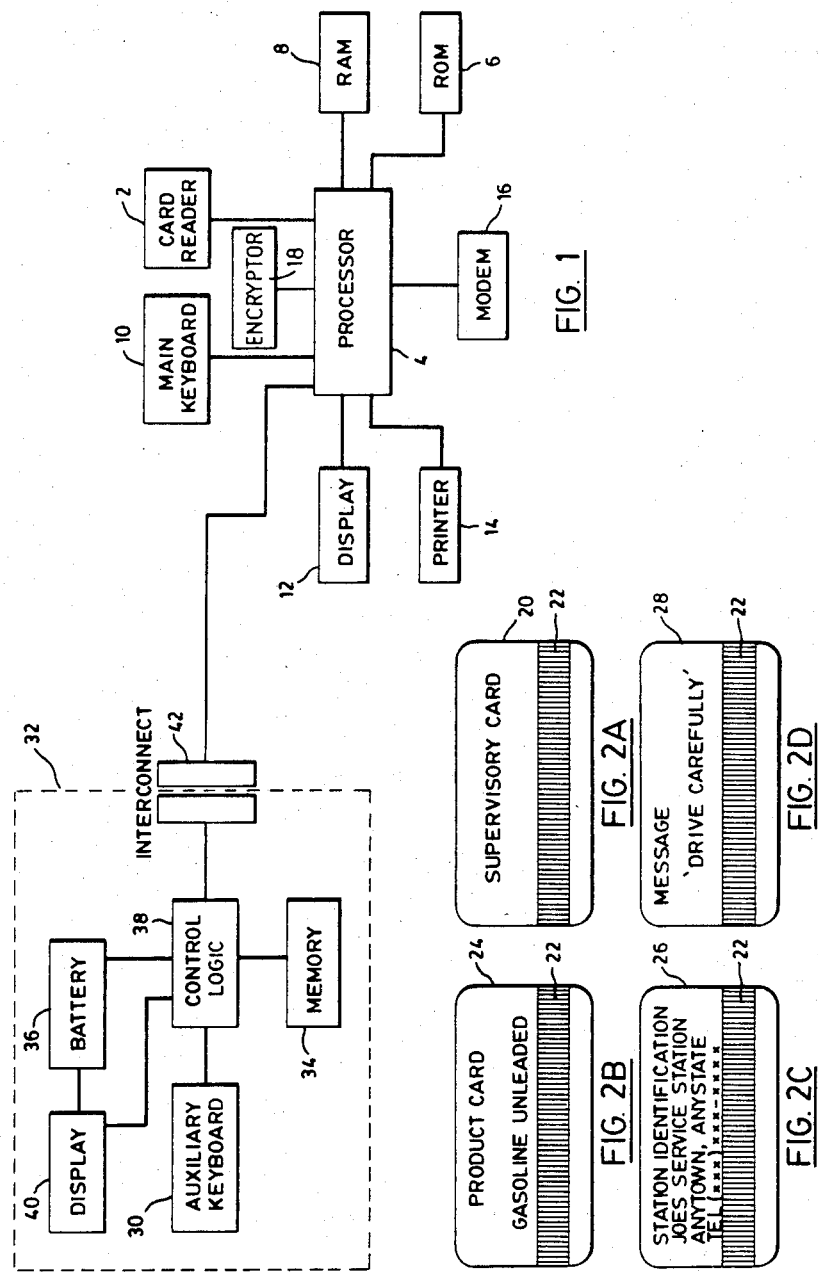

DATA ENTRY SYSTEM

REFERENCE TO RELATED APPLICATION

This application is a continuation-in-part of copending application Ser. No. 455,044 of Patrick Berstein, filed Jan. 3, 1983, now U.S. Pat. No. 532,416, July 30, 1985.

FIELD OF THE INVENTION

This invention relates to data entry terminals, and more especially point of sale or transaction data entry terminals capable of handling credit card transactions.

BACKGROUND OF THE INVENTION

Of recent years, there has been an increasing use of credit cards carrying machine readable coding identifying the cardholder's account and including further relevant information, including, in an encoded form, a Personal Identification Number, or PIN, known to the cardholder but not appearing on the card in human readable form. Entry by a cardholder of his PIN in a machine equipped to read the encoded information of the card may be used to confirm a transaction in place of the usual requirement of signed authorization. Although various systems have been developed for storing the encoded information, the currently preferred system utilizes a magnetically striped card carrying two parallel tracks, the information in at least one track (Track 1) being a standardized (ANSI X9.8) format. This in turn facilitates the use of standardized credit card readers. Standards have also been developed for communicating and encrypting data exchanged between data entry terminals and host computers.

Systems have also been developed which will accept data from more than one class of card.

In British Pat. No. 1,019,702 (Jones), a point of sale terminal has a reader which reads both product data from product labelling, and customer data from credit cards, but both are accepted sequentially as part of a single transaction in a transaction mode.

U.S. Pat. No. 4,300,042 (Odenkamp et al) discloses apparatus for generating different types of card for use in a system. One type of card is a programming card for modifying data in a system, but there is no description of how such cards are actually used.

In the apparatus of U.S. Pat. No. 3,996,450, a reader will accept ordinary credit cards, and also a supervisory card which places the apparatus in a mode in which it can alter data in an ordinary credit card. The effect of the supervisory card is to change the manner in which the apparatus treats a credit card.

Proposals have also been made for portable data entry devices for manual entry of numerical and code data, which can then be conveyed to a fixed terminal for further processing. An example of such a device is disclosed in U.S. Pat. No. 4,125,871 (Martin).

SUMMARY OF THE INVENTION

The present invention seeks to provide simplified operation of a data entry terminal equipped with a credit card reader. Although it will be specifically described with reference to a unit adapted to read ANSI standard encoded magnetic stripe cards, the operation of the invention is not dependent upon the technique utilized to store information on or in the card, provided that such information is machine readable and a suitable reader is incorporated in the unit.

In order to facilitate confirmation of credit card transactions using a terminal equipped with a credit card reader, it is very desirable that facilities be provided for entry of a customer's PIN so as to enable transactions to be verified without obtaining the customer's signature on an imprinted sales slip. In an application of a terminal such as at a full service filling station, a conventional credit card transaction involves multiple trips of an attendant between the customer's vehicle and an office which may be some distance away, over a route which will be more or less exposed to the elements and may be crowded with vehicles and equipment. In order for use of the PIN to be really practicable, facilities must be provided for customer entry of the PIN under circumstances which enable the customer to enter the number in privacy.

According to the invention, a transaction terminal comprises a reader to read data from suitably encoded credit cards, a main keyboard, a main display for displaying information including data entered through the keyboard, a printer, a data processor receiving data from said reader and at least one keyboard, and a program memory containing selectable programs for operating said terminal in a plurality of modes in which it receives data from said credit card reader, wherein the terminal further includes a portable keyboard detachable from the remainder of the terminal and operable when detached to receive a data entry required as part of a transaction at a point remote from the remainder of the terminal and operable to transfer it to the processor independently of the main keyboard and display when reunited with the remainder of the terminal.

It is important in a system of this type to maintain a high degree of security to avoid a customer's PIN number becoming available to unauthorized persons. This is achieved in a preferred embodiment of the present invention by providing a slot in the portable keyboard to receive and enclose a customer's card apart from that portion carrying machine readable data, and switch means responsive to the presence of a card in the slot and permitting retention of data entries only for so long as the card remains in the slot. Preferably also the portable keyboard incorporates a data encryptor operative to encode a PIN prior to its transfer to the remainder of the terminal.

With this arrangement, the portable keyboard can be taken to the customer for PIN entry, without the entry appearing on the main display or the customer requiring access to the main terminal keyboard Moreover, by making use of the facilities required in any case for encrypting a PIN entered by a customer, the issue of new credit cards can be facilitated. Thus the terminal can encrypt a number selected by the customer, and output the code in whatever manner suits the procedure adopted by the card issuer. This avoids the necessity of the customer either having to visit a central office to select a PIN, or to disclose the PIN to local staff, yet requires no additional hardware at the terminal Further features of the invention will become apparent from the following description of a preferred embodiment of the invention.

SHORT DESCRIPTION OF THE DRAWINGS

In the drawings:

FIG. 1 is a block schematic diagram of a terminal in accordance with the invention;

FIG. 2A illustrates a supervisory card that may be employed in conjunction with the terminal;

FIG. 2B illustrates a product card that may be employed in conjunction with the terminal;

FIG. 2C illustrates a station identification card that may be employed in conjunction with the terminal; and FIG. 2D illustrates a message card that may be employed in conjunction with the terminal.

DESCRIPTION OF THE PREFERRED EMBODIMENT

Figure 3:
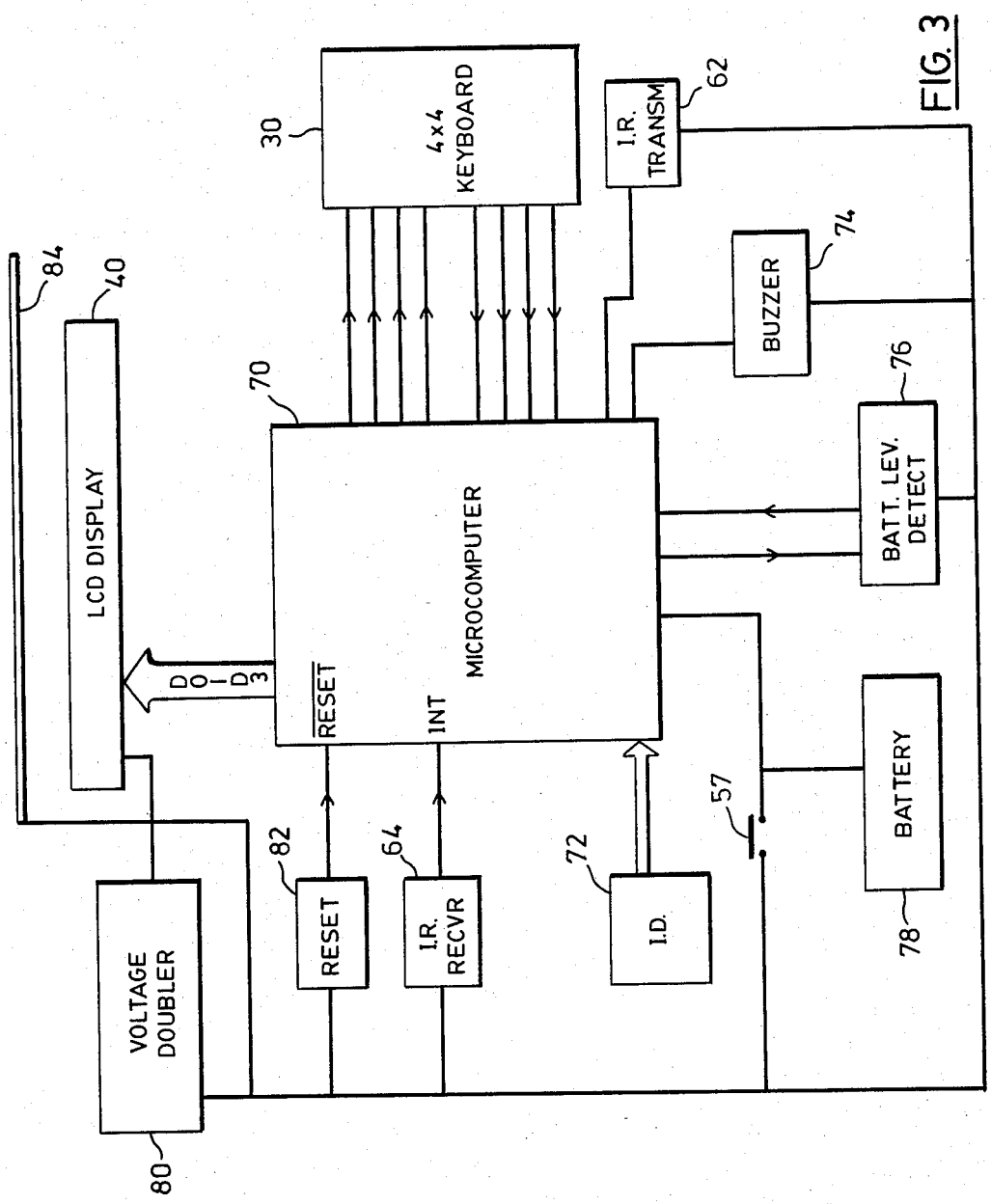
FIG. 3 is a more detailed block schematic diagram of an embodiment of the portable keyboard unit.

Referring to FIG. 1, the general arrangement shown is little different from known transaction data entry terminals incorporating a card reader 2. The card reader is typically an ANSI standard Track 1 manual swipe magnetic card reader, although it will be understood that the card reader will be selected to be appropriate to the type and encoding of the cards to be utilized. It may also incorporate means for updating the encoded information on the card. Except as further described below, the construction and functioning of the card reader and its interfacing with a processor 4 form no part of the invention, provided that it is capable of recovering data from a card presented to the reader and transferring it to the processor, the latter having a memory including read only memory 6 and random access memory 8. The processor is provided with various conventional peripherals such as a data entry keyboard 10, a data display 12, a printer 14, and a modem 16 through which it can communicate with a host computer.

Other than from the host computer, and an auxiliary keyboard whose function is described further below, data can be entered into the processor only from the keyboard 10 and the card reader 2. A difference from known terminals is that certain types of keyboard entry are replaced by data entered by means of special categories of cards, other than the usual customer cards, cards of which special categories form an integral part of the system. These cards are similarly constructed to conventional customer cards, but will carry some visual identification so as to enable differentiation by an operator. Cards bearing examples of such identifications are shown in FIGS. 2A to 2D. These cards carry codes which can be read by the reader 2, and which replace keyboard data entries utilized in conventional terminals. The function and construction of the processor can be otherwise identical to that of a conventional reader equipped terminal, except for changes in the programming stored in the ROM 6 to enable the processor to accept the appropriate codes from the card reader rather than the keyboard, and to prompt card rather then keyboard entries where appropriate. Such changes are well within the scope of ordinary programing skills and since they will in any case be dependent upon the nature of the remainder of the programming of the processor they will not be described in detail.

The first of the cards to be considered is the supervisory card 20 shown in FIG. 2A. In a practical transaction terminal, various modes of operation are desirable in addition to the normal mode in which details of transactions are entered and stored and receipts or other transaction records printed. These modes are known generally as supervisory modes. Thus one such mode provides for carrying out reconciliation totals. Other modes provide for alteration of data stored in the memory 8 in the unit, other than by ordinary transactions. A supervisory card may be utilized to enter a code from its magnetic stripe 22 which conditions the unit to accept a further keyboard entry selecting a particular supervisory mode. A particular supervisory card may have a code permitting access to all supervisory modes, or only selected modes, or even only a single mode. Such supervisory modes may include a reconciliation mode as mentioned above, a test mode for verifying proper operation of the unit, and various data entry modes. In at least certain of those data entry modes, data entry is at least in part by means of further data entry cards of which exemplary cards 24, 26, 28 are shown in FIGS. 2B, 2C and 2D.

The product cards 24 are utilized when the unit is in a product entry mode. Thus the unit may be programmed to store data (identification, price, or unit price) concerning a number, for example 10, of different products. This data may be changed by using a supervisory card followed by a single digit keyboard entry to select the product entry mode and then keying in the product number, which will prompt the unit to show on the display a request for entry of a product card. This card will identify a product and will prompt the unit to display the product identification and other data appropriate to the product such as a unit price. This other data may then be cleared and replaced by keyboard entry so as to establish a new unit price. In some cases, no additional data is required by the machine, and the card is merely used to establish the product or category of product to which a particular product number relates and to enter the appropriate data from the card into the memory 8. The unit may be programmed so that making an entry without a product number will produce a prompt for a request to print out on printer 14 a list of the product data stored by the terminal under each product number, which list may be placed on the terminal or elsewhere for reference by the operator.

Further cards may be utilized in the supervisory modes whenever it is necessary to enter alphabetic or alphanumeric information which can conveniently be stored in the relatively permanent format of a coded card. Thus in a further supervisory mode entered by an appropriate keyboard entry after use of an appropriate supervisory card 20, the name, address and telephone number of an establishment such as a service station at which the terminal is located may be entered by inserting, upon display of the appropriate prompt, a station identification card 26, which carries the appropriate data together with a code identifying it as data to be printed at the head of every receipt or other message printed by the printer 14.

In effect, the data entry cards provide the text of alphanumeric messages to be displayed or printed by the terminal during use, and which need to be capable of local alteration.

Similarly, in yet a further supervisory mode selected by appropriate keyboard entry following use of a supervisory card 20, an end-of-receipt message such as "Drive Carefully" (together with suitable code identifying it as such) may be entered using a message card 28. Use of such cards means that a local operator can program the terminal with appropriate alphabetic or alphanumeric data for inclusion in receipts and messages to be printed by the printer 14, quickly and without the terminal requiring an alphanumeric keyboard, since all necessary keyboard entries may be made using a numeric keyboard, with a minimal number of additional function keys. Basically, only "Clear38 and "Enter" keys are required in addition to numeric keys, but it will usually be convenient to include extra function keys such as "Credit to Account", "Back Step" (to correct mistakes in entry), "Cash" (to indicate a cash transaction and thus enable data entries to be made without prior reading of a customer card), and "Total".

All of these functions as well as the numerals 0–9 may be accommodated on a 4×4 key matrix, which not only saves cost but may also be much smaller than an alphanumeric keyboard. Furthermore, it means that the keyboard may readily be duplicated to provide additional portable keyboard units which may be handed to a customer at a point of sale such as a service station fuel pump. In its simplest form such a portable keyboard 30 may be connected to the rest of the terminal by a flexible cable, but in a preferred arrangement a portable keyboard is provided which forms part of a unit 32 which is wholly separable from the terminal, and comprises the keyboard 30, which is similar to the keyboard 10 but may have less function keys, a memory 34 organized to store data entered by successive key strokes, under the control of control logic 38, an optional display 40 to display the numbered entered during entry, again under control of the logic 38, and a battery 36 to power the unit. When the unit 32 is plugged into the terminal by means of an interconnect 42, the memory is read under control of the processor 4 and the stored sequence of numbers accepted in place of an entry from the keyboard 10. Means may be provided to recharge the battery 36 while the unit is plugged in. In order to avoid a reliability problem associated with physical contacts, the interconnect 42 may be established by inductive coupling, or in the embodiment described further below, infrared coupling.

The advantages of including such an auxiliary keyboard which can be taken to a customer are several, and may be illustrated by considering an application of the terminal in a full service filling station. Normally speaking, a conventional credit card transaction in such a station requires an attendant to take a customer's card, go to an office to fill out and imprint a sales slip, and carry out any necessary verification and authorization procedures and return to the vehicle with the sales slip to obtain the customer's signature. It is necessary to have available both a writing implement and something upon which to support the sales slip during signature, and copies of the sales slip must subsequently be returned to the office. A considerable amount of manipulation is required on the part of the attendant, which slows down operation particularly under bad weather conditions. When using an auxiliary keyboard unit 32, the attendant hands the unit to the customer who enters a PIN, and then takes both the unit and the customer's card to the office where the remainder of the terminal is located. The unit 32 is then again plugged into the terminal and downloads the data it contains (including in this case the PIN number), and the card is passed through the reader 2 as part of a normal transaction sequence. Assuming that the sequence proceeds normally, the terminal will print a transaction slip which is returned to the customer with the card to complete the transaction. Clearly, the amount of manipulation required by the attendant is greatly reduced, and neither attendant nor customer is required to write anything. If the customer comes to the office, a cable connected portable keyboard 30 may be handed to the customer for entry of the customer's PIN.

When the portable keyboard unit is wholly separable from the main terminal, then the terminal processor cannot prompt for entries in the normal way. In this case, data can be entered by entering codes denoting the type of data, followed by the data itself. When the data is downloaded from the keyboard unit memory 34 into the terminal memory 8, the codes associated with the data identify it so that it can be utilized by the terminal at an appropriate point in a data acquisition sequence in place of data entered through the main keyboard 10. In a first embodiment of keyboard unit, an appropriate code entered by an operator before handing the unit to a customer for PIN entry not only identifies the entry as a PIN but instructs the terminal not to display or print out the PIN. The control logic 38 of the unit is configured so that, at least in the case of a PIN entry, completion of the entry by striking an enter key removes the entry from the display 40 (if provided) and it is thereafter prevented from being displayed either on the display 40 or the display 12, or printed out on the printer 14. The unit may, if a display 40 is provided, also be utilized by the operator to enter and display a total amount of a billing to be authorized which can be shown to the customer before handing over the unit for entry of the PIN. On return of the unit to the remainder of the terminal, a check can be made that the total authorized agrees with that arrived by the terminal itself, before the transaction sequence is completed and a transaction slip printed. The PIN is also encrypted by an encryptor 18, which may be implemented by a commercially available data encryption unit such as the Intel (Trade Mark) 8294. Such an encryption unit, when supplied with an appropriate encryption code and data to be encoded will encode the data according to the Federal Information Processing data encryption standard using the National Bureau of Standards encryption algorithm. The encrypted PIN is compared with the encrypted PIN read from the customer's card by the reader to confirm the transaction.

This capability of allowing a customer to enter a PIN with privacy, and the fact that the terminal already includes the encryptor 18, also facilitates inclusion of a further customer service, by which a customer applying for a credit card is enabled to select a PIN of the customer's choice. A supervisory card 20 is used, followed by a numerical keyboard entry through the keyboard 10 to place the terminal in an encryption mode in which an encryption program is enabled. When a customer's credit card application is approved, the customer is informed of the account number. The customer enters first the account number, and then keys in a selected four digit number on the appropriately enabled portable keyboard 30. In practice it will be convenient to have the customer key in the four digit number twice, to provide confirmation and to produce an eight digit number, and then press the enter key which clears the display 40 (if provided) and transfers the number to the memory 34. When the keyboard unit 32 is plugged into the main terminal and downloads the memorized number, the encryption program encrypts the number to provide a code which can be forwarded to central office with other data from the terminal via the modem 16. If a cable connected keyboard unit 30 is used, then the customer must be asked to enter the PIN when the appropriate prompt appears on the display 12. It will be understood that the actual procedure used may be varied to suit circumstances and security requirements, the important feature being that the presence at one terminal of both an encryption unit and a keyboard, separate from but communicating with the main terminal, enables PIN number selection to be carried out at the terminal in a secure manner. Improved security and ease of use is obtained using the embodiment of the portable unit described below with reference to FIGS. 3 to 5.

A further advantage of the separable unit 32 is that it can be used for data acquisition whilst leaving the remainder of the terminal free for dealing with other transactions. Indeed, it is possible to equip each attendant with a unit 32 whilst having only a single terminal or at any rate only as many terminals as are required to handle the required transactions.

Supervisory cards 20 can also be utilized to place the terminal in other supervisory modes, selected by suitable keyboard entries after reading of a card 20. These modes can include a diagnostic mode in which the functions of the terminal can be tested by suitable keyboard entries. Other modes enable a calendar clock function provided by the processor 4 to be checked or reset so that the correct date and time is printed on receipts by the printer 14, enable entries to be made ensuring the application of local tax rates, enable entries to be made in respect of cash added or removed from a cash drawer other than in the course of a transaction, and enable entries to be made to set authorization limits for credit transactions so that an operator is notified of an authorization requirement where necessary. It should be understood that such facilities are already known in electronic cash registers and transaction terminals and that the programming and electronic components of the system as a whole can follow conventional lines, except for minor alterations to the programming to enable the terminal to accept certain data from the card reader in place of or alternatively to the keyboard. This permits use of a simplified keyboard, simplifies operation, and improves control of access to the supervisory function. The simplified keyboard also simplifies provision of a portable keyboard as already desrcibed, which in turn makes it more practical to confirm transactions by entry of a customer's PIN.

Figure 4:
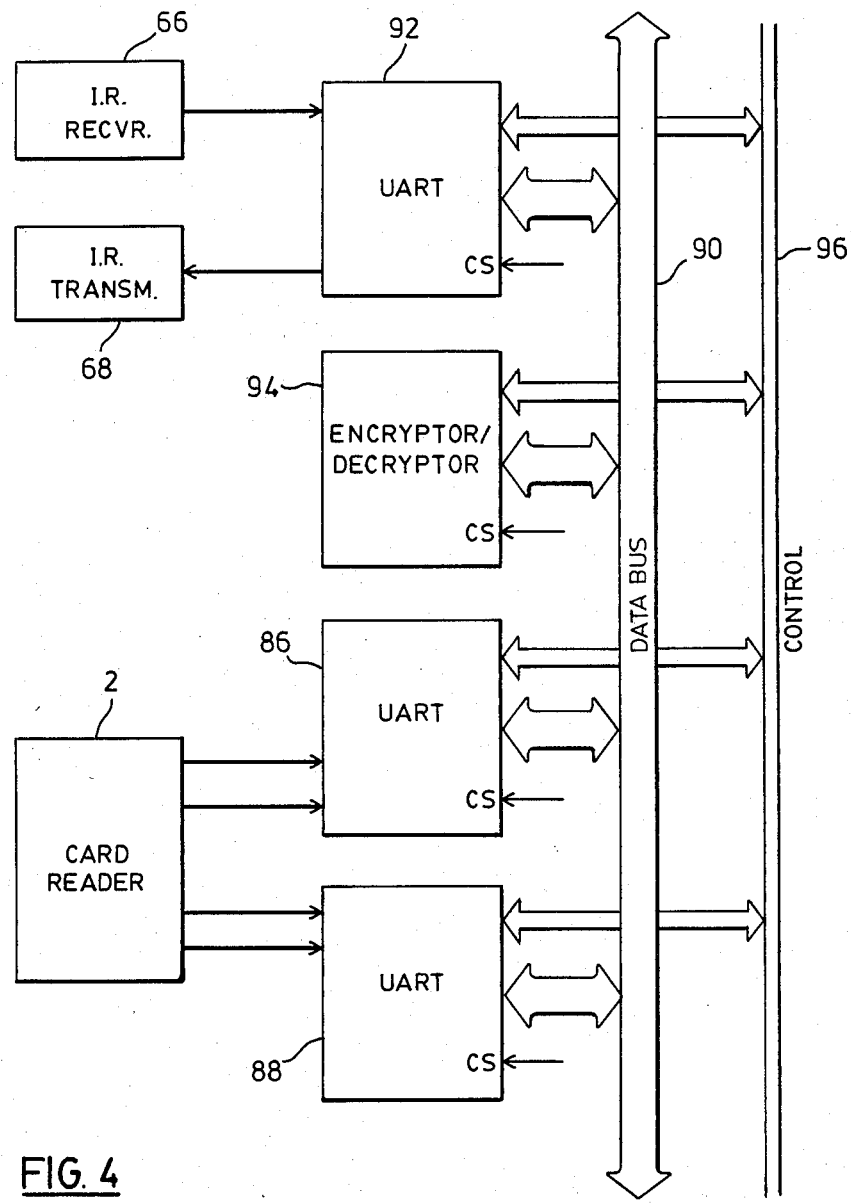
FIG. 4 is a more detailed block schematic of those portions of the main terminal unit directly coperating with the portable keyboard unit.
Figure 5:
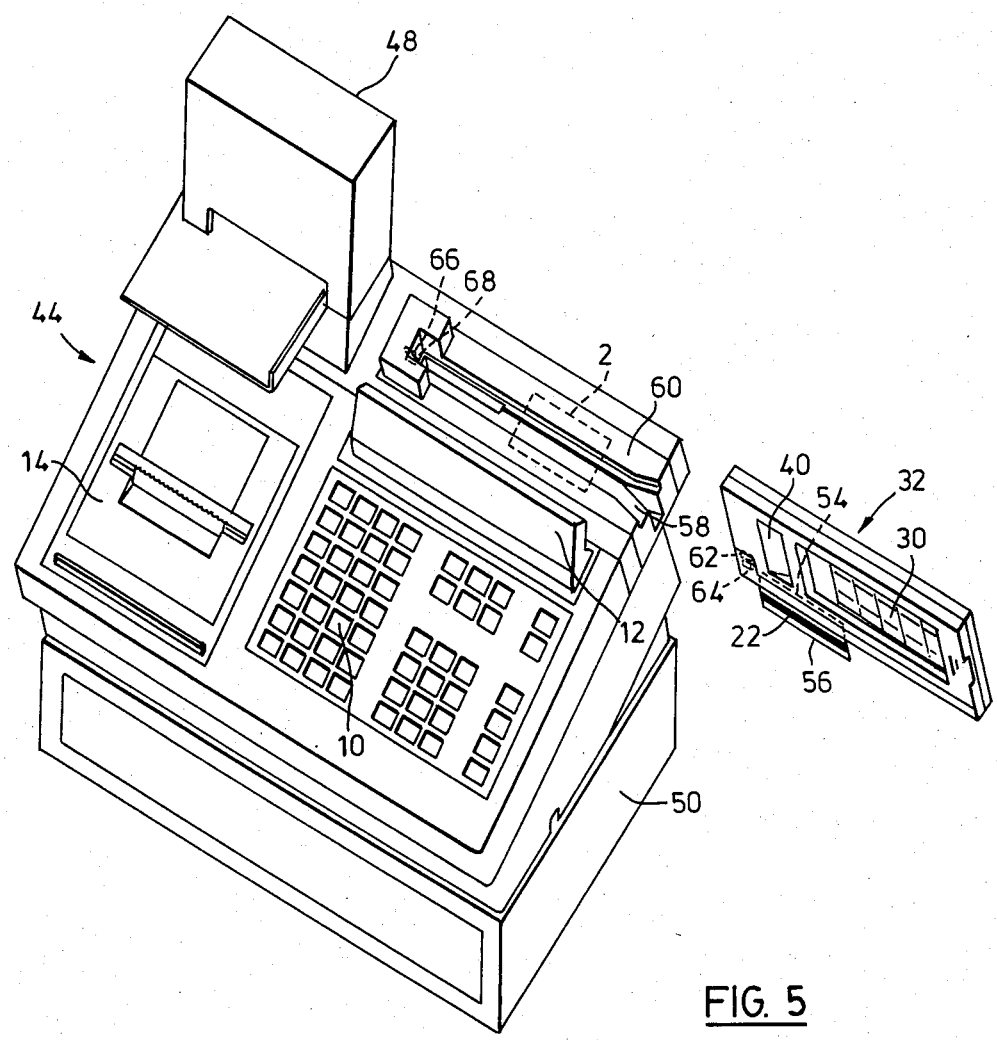
FIG. 5 is a perspective view illustrating the physical interaction of the portable keyboard unit and the main terminal unit.

Referring to FIGS. 3 to 5, a preferred embodiment of portable keyboard is shown in more detail, and includes features to improve the security of transactions.

FIG. 5 shows an exemplary form of transaction terminal in accordance with the invention, consisting of a main terminal unit 44, and the portable keyboard unit or PIN pad 32. The main terminal unit presents conventional features of a transaction terminal such as the keyboard 10, the printer 14, and the display 12, as well as a sales slip imprinter 48 and a cash drawer 50. The card reader 2 is located within a special housing 52 described further below and designed to interact with the unit 32.

The PIN pad unit 32 incorporates all of the components described with reference to FIG. 1, of which the display 40 and auxiliary keyboard or keypad 30 are visible in FIG. 5. The housing of the pad is formed with a slot 54 to receive a customer's credit card 56 in such a manner that a portion of the card carrying the magnetically coded stripe 22 remains projecting from the slot, whilst the human readable characters representing the cardholder's name and number are hidden within the slot. Within the slot is a switch 57 (see FIG. 3) which is held closed for so long as a card remains fully inserted in the slot. When the lower (as seen in the drawing) edge of the PIN pad is moved from the right (as shown) into a track 58 defined in the housing 52, the projecting portion of the card 56 is guided into a slit 60 wherein it is scanned by the card reader 2. Additionally, the housing 52 guides the unit 32 so that as it approaches the end of the track 58, an infrared emitting diode comprised by an infrared transmitter 62, and an infrared sensitive phototransistor comprised by an infrared receiver 64, both in the unit 32, are optically aligned with an infrared receiver 66 and transmitter 68 within an enclosure at the end of the track 58. These transmitters and receivers together constitute the interconnect 42 of FIG. 2.

Referring to FIG. 3, the control logic 38 and memory 34 of the unit 32 are combined into a microcomputer 70, for example a 146805G2 microcomputer chip from Motorola, which is a CMOS version of the 6805 microcomputer chip incorporating a microprocessor, random access memory, erasable programmable read only memory, and thirty-two lines programmable as inputs or outputs from or to various peripherals. Eight of those lines, programmed as four inputs and four outputs, are used to poll the keyboard 30, and a further seven programmed as outputs, drive the liquid crystal display 40. A further four, programmed as inputs, are selectively jumpered high or low by an I.D. block 72 so as to provide an identification signal identifying the unit 32 in the event that several such units are employed at one location. A further line, programmed as an output, drives the infrared transmitter 62, and yet a further line, programmed as an input drives a buzzer 74 under control of a subroutine providing audible indication of the entry of a character through the keyboard 30, or of a low battery condition as detected by a battery level detector circuit 76 polled using a further input and a further output line.

The microprocessor is powered directly by a battery 78, but all those peripherals which consume power, including pull-up resistors (not shown) for the keyboard, receive power via the switch 57, and in the case of the display 40 via a voltage doubler circuit 80. Power transmitted via the switch 57 also maintains a reset circuit 82 in a disabled condition, such that a $\overline{\text{RESET}}$ input of the microcomputer 70 is held high, thus enabling the latter. An optional thermostatically controlled heater element 84 is provided behind the display 40, to ensure proper functioning of the display in the event that the unit has to be used in very low ambient temperatures.

FIG. 4 is a block diagram of a portion of the circuit of the main terminal unit 44. The card reader 2 has separate heads serially reading data in upper and lower tracks of the stripe 22, from which it recovers serial digital data streams and clock signals which are converted to parallel data by means of USARTs 86 and 88 and applied to data bus 90 of the terminal. Similarly, the receiver 66 and transmitter 68 are linked to the bus 90 by a further USART 92, as is a data encryptor/decryptor unit 94. These functions may be implemented by readily available chips such as the 8251A for the USARTs and the 8294 for the encryptor/ decryptor.

In use, the unit 32 remains in a dormant condition, with only the microcomputer 70 powered up, until a credit card is inserted in the slot 54 so as to close the switch 57, activate the peripherals and pull the $\overline{\text{RESET}}$ line high. Removal of the card will power down the peripherals and insertion will reset the computer, causing an initialization routine to clear and reinitialize those portions of the random access memory of the computer used for storing data entered from the keyboard. Other portions of memory are retained, and for this reason the switch 57 is not operative to cut off power to the microcomputer 70. Hence the unit can only receive data via the keyboard and transfer it to the main unit 44 provided that a credit card remains continuously in the slot 54 throughout the process.

Before a unit 32 is put into use, it must be validated by inserting an appropriately coded supervisory card 20 in the slot 54 which initializes the microcomputer 70 as described above. The unit with the card 20 is then moved through the track 58 on the main unit 44 so that the magnetic stripe 22 on the card is swiped through the card reader 2. This places the terminal in a supervisory mode in which it first uses the interface 42, as described further below, to pass a command to the unit 32 requiring it to send back, via the interface 42, its identification code as set by its ID block 72. The unit 44 logs in the unit 32 so that data subsequently received from a unit with that identification code will be recognized, and transmits a further enabling code to the unit 32 which enables its keyboard to accept entries, provided of course that a card is in the slot 54. This enabling code, together with any other validation codes or data, it may be deemed to transmit to and retain in the unit 32 for subsequent use, is stored in portions of the unit's random access memory which are not cleared by the initialization routine that occurs on reset.

In one mode of use, for example in connection with a sale of gasoline at a full service filling station, an attendant takes a customer's credit card, places it in the slot 54 in a unit 32 which has been validated as described above and issued to the attendant, thus resetting and initializing the microcomputer 70, and presses a START key provided on the keyboard 30. This initiates a routine which first causes the display 40 to exhibit a prompt such as "ENTER AMOUNT" and initiates a keyboard polling routine to permit keyboard entries from a numeric pad which are entered on the display. When the entry is completed, the unit with the displayed amount is handed to the customer for verification. The customer confirms the transaction total so entered by pressing an ENTER key which causes transfer of the amount from a keyboard register into a storage register provided in the random access memory of the microcomputer. A prompt such as "ENTER PIN" is then exhibited on the display, and the customer then enters the PIN number associated with the card inserted in the unit, completing the entry by use of an entry key. The microcomputer is programmed so that during this entry a character such as an asterisk is entered on the display 40, rather than the actual character entered, thus preserving security.

After successful entry of the above discussed two items of data, the unit 32 with the credit card still inserted is taken to the main terminal unit 44 where its lower edge is moved through the track 58 so as to swipe the magnetic stripe 22 of the card 56 through the card reader 2. The data read from the card by the reader is converted from serial to parallel from the USARTs 86, 88 and applied to the data bus 90 of the processor 4 (see FIG. 1) under the control of signals on a control and address bus 96. Likewise, data is transferred between the unit 44 and the unit 32 through the interface 42 using essentially conventional serial communication protocols. In practice, since microcomputer 70 receives incoming serial data from the receiver 64 via its interrupt line, the transfer of data from the unit 44 takes control of the microcomputer 70 and causes it to accept commands and data from unit 44. Typically, the unit 44, after verifying the identity of the unit 32, transmits to the unit 32 a command to encrypt the PIN which it holds in its memory, using a working key which has been derived by the encryptor/decryptor unit 94 from the data read from the customer's card 56 using a master key programmed in the unit 44, in accordance with the procedures laid down in ANSI standard X9.8. Using the working key supplied to the unit 32 via the interface 42, the PIN stored in a register set up in the microcomputer random access memory is then encrypted. The encryption is again preferably in accordance with the data encryption algorithm specified in ANSI standard X9.8 and provides a PIN data block configured in accordance with that standard, which is transmitted to the unit 44 via interface 42, together with data as to the transaction total. Since the amount of data to be transferred is normally not large, a data transfer rate of 1200 baud enables normal transfers to be completed in a fraction of a second. Successful completion of a transfer can be signalled by means of an audible or visible signal provided by the unit 44.

It will be appreciated that the foregoing description provides only a basic outline of one important mode of use of the apparatus. It will be appreciated that the data entry sequence can be extended to prompt for the entry of additional data, such as product type or quantity involved in the transaction, vehicle registration numbers and so on. In order to cope with operator or customer errors, routines are provided to clear and re-enter erroneous entries, and to provide audible signals from the buzzer 74 where this will facilitate operation. Subroutines appropriate for execution of all these conventional data entry and transfer functions will be familiar to those accustomed to programming microcomputers such as the 6805, and will not be described in detail.

It will also be appreciated that different or alternative modes of use may be appropriate according to the environment in which the system is utilized, and the manner in which a transaction is entered, and microcomputer 70 may be programmed accordingly. It may be desired to enter transaction data via the main unit 44, which may for example be interfaced with a fuel pump control console from which it receives transaction data directly. In this case, the unit 32, loaded with the customer's card, may be swiped through the track 58 to enable the card data to be read, and to receive transaction data from the unit 44. This transaction data can then be verified by the customer, and a PIN entered as before, after which a further swipe of the unit 32 through the unit 44 is required to encode and download the PIN and confirm the transaction.

It will be appreciated that the PIN is never transferred or displayed in unencoded form, and thus a high degree of security can be maintained. The PIN can only be retained in the unit 32 for so long as the card 56 remains present. Removal of the card will disable the microcomputer by pulling the RESET line low and disabling the peripherals to render the data inaccessible, and substitution of another card will re-initialize the microcomputer and destroy the data. The body of the unit 32 is preferably constructed so that any attempt at disassembly will open the switch 57 and thus have the same effect as removing the card.

We claim:

1. A transaction terminal comprising a reader to read data from suitably encoded credit cards, a main keyboard, a main display for displaying information including data entered through the keyboard, a printer, a data processor receiving data from said reader and at least one keyboard, and a program memory containing selectable programs for operating said terminal in a plurality of modes in which it receives data from said credit card reader, wherein the terminal further includes a portable keyboard detachable from the remainder of the terminal and operable when detached to receive a data entry required as part of a transaction at a point remote from the remainder of the terminal and operable to transfer it to the processor independently of the main keyboard and display when reunited with the remainder of the terminal, wherein the portable keyboard unit comprises a memory, a power supply, control logic operative to store keyboard entries in the memory, and an interface to transfer data from the memory to the remainder of the terminal when the keyboard unit is united with the remainder of the terminal, and wherein the portable keyboard unit further includes means to engage a credit card so as to present an encoded portion of the card for reading by said reader, and the unit is united with the terminal for transfer of data when a card is so presented.

2. A terminal according to claim 1, including means to guide a portable keyboard unit and a card held thereby along a path such as to pass the encoded portion of said card through the reader and to establish a data transmission interface between the terminal and the keyboard unit.

3. A terminal according to claim 2, wherein the interface is optical.

4. A terminal according to claim 2, wherein the interface is bidirectional.

5. A terminal according to claim 2, wherein the interface comprises two optoelectronic transmitter/receiver pairs.

6. A terminal according to claim 1, wherein the portable keyboard unit includes switch means operated by engagement with the unit of a credit card and operative on removal of the card to disable said interface and prevent transfer of data entered into the keyboard unit.

7. A terminal according to claim 1, wherein the portable keyboard unit includes switch means operative to disable the keyboard unit for the receipt and transfer of data except when a credit card is engaged therein.

8. A terminal according to claim 7, wherein the control logic of the keyboard unit is implemented by a microcomputer, and said switch is operative on engagement by the credit card to initialize said microcomputer and set up registers in said memory for receipt of data from said keyboard.

9. A terminal according to claim 8, wherein said microcomputer is programmed with a data encryption routine operative whilst the unit is engaged with the terminal to encode data stored in at least one of said registers on receipt of an encryption key from said terminal, and to cause said interface to transmit said encoded data to the terminal.

10. A terminal according to claim 9, wherein the terminal unit includes encryption means responsive to data read by said reader from a card retained in said keyboard unit to generate an encryption key and transmit it to said keyboard unit whilst still engaged with the terminal.

11. A terminal according to claim 5, wherein the means in the portable keyboard unit to engage a credit card is a slot in a wall thereof, and the terminal comprises a track along which that wall of the keyboard unit can be advanced in a defined direction, with a slit in that track to receive the encoded portion of the card, the reader being located beneath the slit, one optoelectronic transmitter/receiver pair being located at an end of the track facing the direction of advance of the keyboard unit, and the other transmitter/receiver pair being located in alignment with said one pair in a wall of the keyboard unit facing said end of the track.

12. A terminal according to claim 8, including a supervisory card engageable with the keyboard unit and the keyboard unit including means to transmit an identification signal to the terminal, the supervisory card carrying data which when read by the reader places the terminal in a supervisory mode in which it reads the identification signal of the keyboard unit and logs it as a unit from which it may accept data.

13. A portable keyboard unit engageable with a transaction terminal to enter data therein, comprising a body, a keyboard supported by said body for the entry of data, means to store data entered by said keyboard, means to transfer data from said store to said terminal when engaged therewith, and means to hold a credit card having an encoded portion such that said encoded portion will be presented to a credit card reader in said transaction terminal when the keyboard unit is engaged therewith.

14. A keyboard unit according to claim 12, including means to enable said data storage means and said data transfer means only responsive to engagement of a credit card with said keyboard unit.

15. A keyboard unit according to claim 13, further including means to encrypt data to be transferred by said data transfer means.

* * * * *